Figure 1:
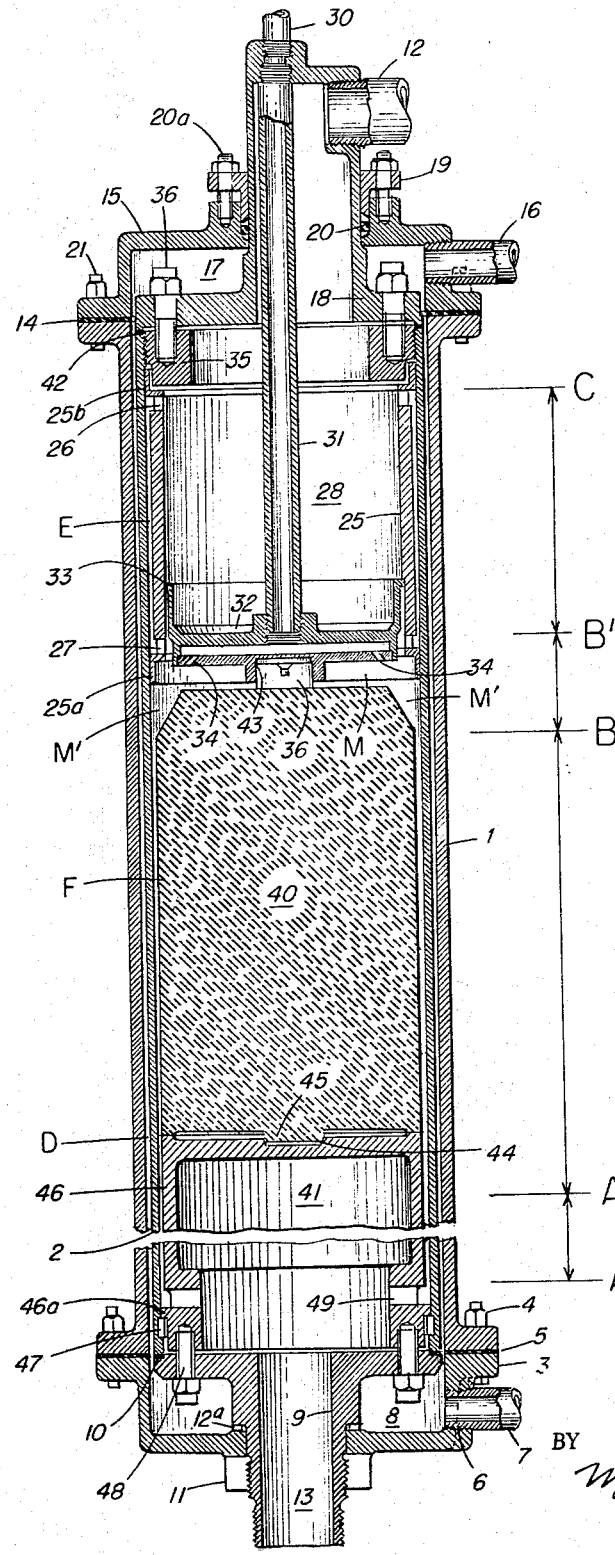

Nov. 1, 1966  E. V. BERGSTROM ETAL  3,283,028
THERMAL CONVERSION PROCESS AND APPARATUS THEREFOR
Filed Oct. 31, 1961  2 Sheets-Sheet 1

INVENTORS
ERIC V. BERGSTROM
JOHN G. MITCHELL
BY
Mitchell J. Condos
ATTORNEY

Nov. 1, 1966  E. V. BERGSTROM ETAL  3,283,028
THERMAL CONVERSION PROCESS AND APPARATUS THEREFOR
Filed Oct. 31, 1961  2 Sheets-Sheet 2
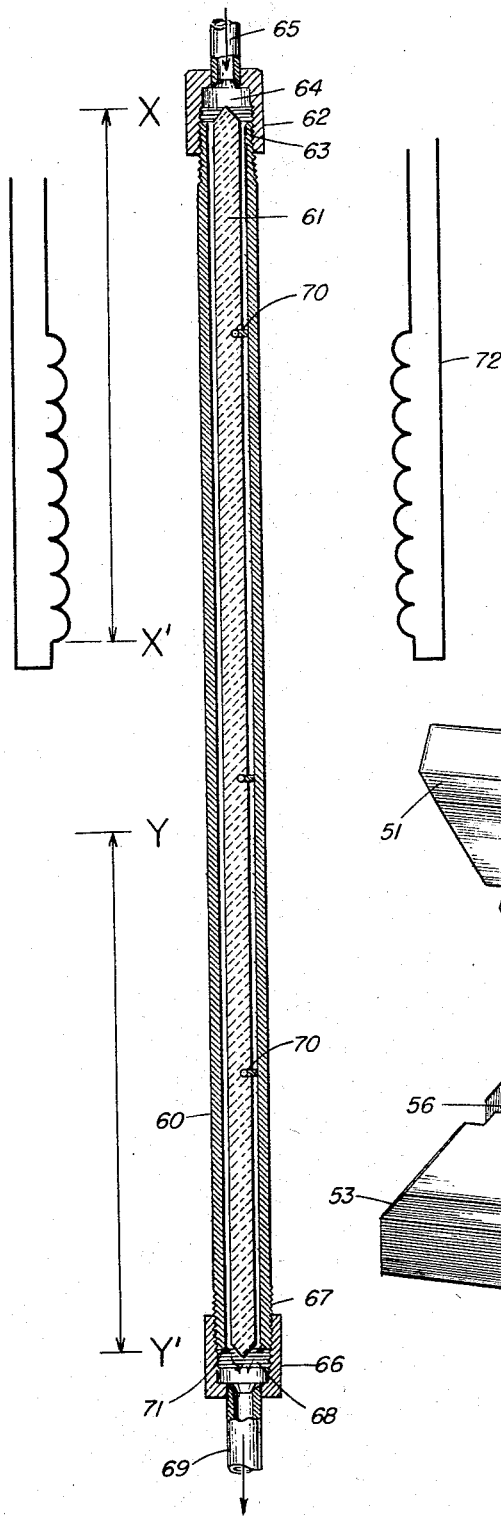
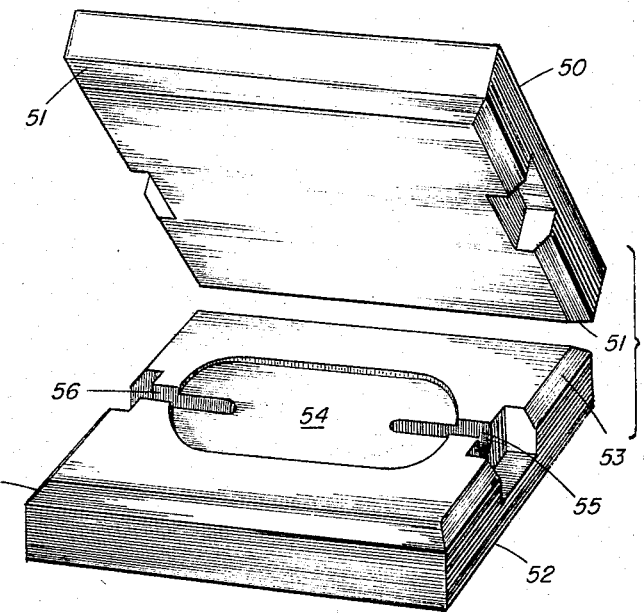
FIG. 3
FIG. 2
INVENTORS
ERIC V. BERGSTROM
JOHN G. MITCHELL
BY
*Mitchell J. Condo*
ATTORNEY

United States Patent Office 3,283,028
Patented Nov. 1, 1966

3,283,028
THERMAL CONVERSION PROCESS AND
APPARATUS THEREFOR
Eric V. Bergstrom, Byram, Conn., and John G. Mitchell,
Larchmont, N.Y., assignors to Mobil Oil Corporation,
a corporation of New York
Filed Oct. 31, 1961, Ser. No. 149,069
16 Claims. (Cl. 260—683)

The present invention relates to an improved process for carrying out thermal conversion reactions and apparatus useful therefor. More particularly, the invention relates to a process for carrying out thermal conversion reactions requiring a relatively high temperature and apparatus adapted to carry out such thermal conversions.

In reference to the process embodied by this invention, it is mainly directed to thermal conversion reactions for materials requiring for thermal conversion a reaction temperature in the range of from about 1200 to about 4000° F. and heat of reaction of from about 2000 to about 12,000 B.t.u. per pound. Although the invention may be used with advantages for carrying out many different types of reactions requiring such temperatures and heat of reaction to effect desired conversions, it is particularly useful with respect to production of unsaturated hydrocarbons by pyrolysis of more saturated hydrocarbons. Thus, reactions embodied by the present invention include production of ethylene and/or acetylene by prolysis of propane, butadiene by pyrolysis of propane or naphthas, methylacetylene and propadiene by pyrolysis of isobutylene, ketene from acetone, isoprene from branched hexenes, and other pyrolysis reactions including, in general, pyrolysis of appropriate hydrocarbons to produce mixtures of more unsaturated hydrocarbons, e.g., mixtures of ethylene and acetylene with temperatures of reaction being one of the main factors as to which product predominates in the reaction product mixture. When, for example, it is desired to produce acetylene as the major product, methane and/or natural gas may be used as the charge stock with pyrolysis being carried out at, preferably, about 2400–2800° F., whereas propane and light naphthas may and are preferably pyrolyzed at about 1500° F. or more, e.g., up to 2000° F., for production of ethylene as the major product. Still other reactions embodied by this invention include production of carbon and hydrogen from methane, hydrogen cyanide by reacting methane with ammonia, carbon disulfide by reaction of sulfur with methane, acrylonitrile by reaction of ammonia with propylene, and others.

Typical of several reactions for which the present invention is suitable and the reaction temperatures and heat of reaction suitable therefor are the following:

| Reactant | Predominant conversion product | Reaction temp. (° F.) | Heat of reaction (B.t.u./lb.) of reactant |
|---|---|---|---|
| Propane | Acetylene | 2,400 | 4,000–4,200 |
| Do | Ethylene | 1,600 | 1,900–2,200 |
| Ethane | do | 1,700 | 1,800–2,000 |
| Ethylene | Acetylene | 1,900–2,000 | 1,400–1,700 |
| Light naphthas | Ethylene | 1,500, 1,800 | 1,800–2,200 |
| Do | Acetylene | 2,100 | 3,200–4,000 |

Among the objects of the present invention is the provision of a process and apparatus for carrying out such reactions with obtainment of increased yield of desired conversion product from a given amount of reactant, minimized dilution of the reaction product with materials requiring extensive and expensive processing and equipment for separation and recovery of the desired conversion product, obtainment in certain instances of increased or equivalent yields of desired conversion product from a given quantity of defined reactant at conversion temperatures lower than heretofore employed by certain other processes; and, in many cases, illustrative of which is the production of unsaturated hydrocarbons by pyrolysis of more saturated hydrocarbons, the obtainment of desired conversion with minimized production of "dry gas," thereby reducing gas plant requirements, and minimized formation of coke and polymeric substances. Still other objects, features and advantages of the present invention will be apparent to those skilled in the art from the following detailed description thereof.

In accordance with the thermal conversion process embodied herein, reactions requiring a temperature and heat of reaction as aforediscussed are carried out by passing the reactant (or reactants, as the case may be), preferably preheated but to an elevated temperature below conversion temperature, through a reaction zone which, by internal surfaces defining said zone, confines the reactant in the conversion zone to a stream having in cross-section an axis averaging not more than about 0.1 inch and preferably substantially less, said reactant being maintained in said reaction zone for from about 0.0001 to about 0.01 (and preferably from about 0.001 to about 0.01) seconds while, by indirect heating, a reaction temperature of from about 1200 to about 4000° F. and a heat of reaction of from about 2000 to about 12,000 B.t.u./lb. of reactant is maintained in the reaction zone by supply to said zone of a heat flux in the range of from about 20,000 to about 200,000 B.t.u./hr./sq. ft. of internal surface of said reaction zone through which heat is supplied and which is at least one of the surfaces confining said stream to said dimension. By use of such a process, in which the reactant passing through the reaction zone picks up heat by convection, it has been found that the required heat of reaction can be provided through a minimized area of heat transfer surface thereby markedly reducing residence time requirements whereby not only are the aforesaid advantages obtained but, of considerable importance, undesirable and objectionable deposition of solids (e.g., coke) on the internal surfaces of the conversion zone is obviated or substantially minimized, thereby enabling carrying out the desired conversion reaction for extended periods of time with minimized requirements for frequent shutdowns due to plugging or stoppage of reactant flow through the conversion zone. In carrying out the aforedefined process, it has been found that the reactant can be passed through the reaction zone at such relatively high linear velocity, and exposed to the reaction temperature for such short periods of time, that any coke that may be formed is carried out of the reactor rather than adhering to wall surfaces of the reaction zone.

In one embodiment, the invention is practiced by use of a reaction zone substantially rectangular in cross section having a charge inlet at one end portion and a product discharge outlet at the opposite end portion and which reaction zone, in cross section, has its smallest axis defined by wall surfaces spaced apart by an average distance of not more than about 0.1 inch and through at least one of which wall surfaces heat is indirectly supplied to the reaction zone to the extent of the aforesaid 20,000 to 200,000 B.t.u./hr./sq. ft. of internal surface area through which heat is supplied. For such an embodiment and other embodiments described herein as well as in general aspects, the method of this invention is practiced with use of a reaction zone that in length is at least about thirty times the aforesaid dimension of not more than about 0.1 inch.

In another embodiment, the reaction zone is of annular configuration such as may be provided by means of two coaxially disposed, concentric cylinders with one being of smaller outside diameter than the inner diameter of the other shell and of such dimensions whereby an annulus averaging not more than about 0.1 inch is provided with the annulus being in open communication at one end portion with an inlet means for charging reactant and at the opposite end portion with a discharge outlet for discharging reaction product, and to which annulus heat flux to the aforesaid extent is supplied by indirect transfer through the walls of at least one of said cylinders. Although still other configurations may be used, as long as the reaction zone for practice of the method embodied herein confines the reactant to a stream having, in cross section, an axis averaging not more than about 0.1 inch, and preferably substantially less such as on the order of from about 0.008 to about 0.07 inch, a reaction zone comprising an annulus formed by concentric, coaxially disposed substantially cylindrical walls is preferred.

In a particularly preferred embodiment, the invention is carried out in a unitary apparatus comprising an elongated annular zone and which annular zone is used as a confined path for sequential preheating of charge material, conversion thereof, and quenching of the reaction product; and particularly in connection with such an embodiment, a novel apparatus, as discussed more fully hereinafter in describing the apparatus of FIG. I, whereby a combustible gas mixture is utilized to provide the required heat flux into the conversion portion of the annulus by indirect heat exchange, an oxidizing component of the ultimate combustible gas mixture, prior to combustion and at an inlet temperature substantially lower than fuel gas combustion temperature, is used to quench the reaction product to an appropriate quench temperature by indirect heat exchange in the quench portion of the annulus whereby the oxidizing component is raised to combustion temperature, and the combustible gas mixture following combustion and heat release to the conversion zone is used to preheat the charge material, passed into the preheat portion of the annulus, by indirect heat exchange wherein the completely combusted gas mixture gives up sensible heat to preheat the charge.

Regarding the means for supplying the required heat flux, by heat transfer through at least one wall defining the conversion zone, as aforediscussed, there may be used any of several types of heat supply means depending on suitability for use in the particular apparatus in which the desired reaction is carried out. Thus, embodied for use in practice of this invention are furnace burning fuels (liquid or gaseous fuels in air, oxygen, etc.) to supply the required heat by convection and/or radiation, induction coils, electrical resistance heaters, nuclear reactors, and others.

In carrying out the reactions embodied herein and illustrated by reactions involving pyrolysis of hydrocarbons, a carrier gas is, in some instances, desirably used with the charge materials. Thus, a gas such as steam is, in some instances, desirably used as its presence may aid in maintaining high velocities, reduce coke formations that may tend to deposit on interior walls of the reaction zone and reduce the partial pressures of the hydrocarbons whereby yields of desired unsaturated products is maximized. Although steam is a preferred carrier gas because of removal of coke deposits, if formed in some instances, through water-gas reaction and its ease of separation from the product, other gases such as hydrogen, nitrogen etc. may be used to help maintain high velocities and lower the partial pressure of the hydrocarbon charge, but with respect thereto, consideration is given to requirements for separation of such carrier gases from the desired products of the reaction product mixtures.

In order to further describe the invention, reference is made to the drawings in which there are set forth embodiments of apparatus suitable for carrying out processes as aforediscussed.

In the drawings, FIG. I is an elevation view, partially in section, of a reactor apparatus adapted for conducting the process of this invention; FIG. II is a perspective view of elements of a reactor suitable for carrying out the process embodied herein; and FIG. III is an elevation view, partially in section, of a further embodiment of a reactor, adapted for use in conducting the process embodied herein.

In reference to the apparatus aspects of the present invention, FIGS. II and III illustrate embodiments of apparatus which, when so designed that the reactant introduced into the conversion zone is confined to a steam averaging not more than about 0.1 inch for its smallest axis in cross section, the thermal conversion process embodied herein can suitably be carried out. In the case of apparatus as shown in FIG. II, the feed to the reactor is preheated by means separate from the reactor as is also the case for quenching of conversion product exiting from the reaction zone. Similarly, for the apparatus of FIG. III, the main preheating of the feed material is generally accomplished by extraneous means as may also be the case for accomplishing substantial quenching of the conversion product. However, in an apparatus illustrated by the embodiment of FIG. I, there is provided an apparatus of unitary type that comprises such a novel combination and arrangement of elements whereby, in a single apparatus, the feed material is preheated, converted and the converted product is quenched. When so designed that the material to be converted is confined, in the reaction zone of apparatus as shown in FIG. I, to a stream having, in cross-section, a minor axis averaging not more than about 0.1 inch, the apparatus of FIG. I provides a highly effective means for carrying out the method of this invention at the aforestated short residence times. However, in the novel combination and arrangement of elements as is illustrated by the apparatus of FIG. I, there is provided an apparatus which is adapted for carrying out thermal conversion reactions of more generic scope than the method defined hereinbefore for example, and as is apparent from the description of the apparatus of FIG. I set forth hereinafter, the apparatus is highly suitable for carrying out thermal conversions at, for example, longer residence times than aforediscussed and in which case the apparatus of FIG. I can be so designed such that reactant passing into the conversion zone is not confined to a stream having, in cross section, an axis averaging not more than about 0.1 inch but to a stream that can be of much larger dimension as to such an axis. Thus, by the embodiment of FIG. I, there is illustrated an apparatus useful for carrying out thermal conversion reactions in more generic manner than the aforesaid defined method and in which more generic aspects, the apparatus of FIG. I provides a unique combination and arrangement of elements whereby in a unitary apparatus, a material to be thermally converted can be preheated, converted and quenched under highly efficient thermal conditions. Although in the more detailed description of the apparatus of FIG. I particular emphasis has been made on its use for carrying out thermal conversions under substantially short residence times, it should be apparent that in its adaptability to carrying out of thermal conversions in general, the apparatus of FIG. I can be so designed as to confine the reactant stream in the reaction zone to a dimension in cross section that may vary to any of many substantially large dimensions as long as the desired thermal conversion is carried out while, at the same time, providing an apparatus that enables carrying out thermal conversion reactions under highly efficient thermal conditions, for preheating the charge, conversion thereof, and quenching of the conversion product. Additionally, a unitary apparatus as set forth by the embodiment of FIG. I provides means, for carrying out thermal conversion processes, with materially reduced investment for equipment as it minimizes or obviates the need for separate means for substantial preheating of the reactant, for providing the required conversion temperature, and for quenching the conversion product. Moreover, such an apparatus obviates the need for introduction of quench media into the conversion product which may not only contaminate the conversion product but would require extensive and expensive equipment for separation of quench media from the desired conversion product, etc. Such advantages provided by an apparatus as shown in FIG. I result from the hereinafter described combination and arrangements of elements whereby, in a unitary apparatus, the conversion product is quenched by indirect heat exchange with an oxidizing gas whereby the oxidizing gas is raised to combustion temperature, mixture of the resultant thus-heated oxidizing gas with a fuel gas whereby the mixture undergoes combustion and, by indirect heat exchange, provides the required heat flux for themal conversion, and sensible heat from the combusted mixture is then used to preheat the charge by indirect heat exchange.

Referring to the drawings, there is shown in FIG. I a reactor having a vertically elongated substantially cylindrical outer metal shell 1 and, coaxially disposed therewith, a vertically elongated substantially cylindrical metal inner shell 2 with shell 2 having a smaller outside diameter than the inner diameter of shell 1 whereby an annular space D is provided in between the outside wall of shell 2 and the inner wall of shell 1. The outer shell 1 is supported, at its base, by support flange 3 by means of bolts 4 which, when tightened, compress gasket 5 to form a seal between shell 1 and support flange 3. Support flange 3 has, as shown, an appropriate internally threaded opening 6 to accommodate an externally threaded inlet conduit 7 in open communication with charge inlet plenum 8 formed by support flange 3 and flange 9. Flange 9 also serves to support inner shell 2 at its base with gasket 10 disposed in between flange 9 and the base of shell 2 whereby a seal is formed in between flange 9 and the base of shell 2. By means of internally threaded ring 11, engaging external threads of support member 9, tightening of ring 11 serves to compress gasket 12a and seal the inlet plenum 8. With flange 9 having a smaller outside diameter than the inner diameter of shell 1 and flange 3, the inlet plenum 8 is in open communication with the annular space D. Flange 9, as shown, has an appropriate central opening providing a gas outlet conduit 13 which, as later discussed, is for discharge of combustion gas from the reactor.

At the top portion of outer shell 1, there is disposed a gasket 14 between the top of shell 1 and flange 15, the latter being bolted to shell 1 by means of bolts 21 whereby gasket 14 is compressed to provide a seal between shell 1 and flange 15. An appropriate internally threaded opening is present in flange 15 to accommodate an externally threaded product discharge conduit 16 in open communication with product discharge plenum 17. Plenum 17, as shown, is provided by the walls of flange 15 and flange 18 that closes the top of the reactor and, being of smaller outside diameter than the inner diameter of shell 1, annular space D is in open communication with plenum 17. To seal plenum 17 and provide for differential thermal expansion, packing gland follower ring 19 compresses packing 20 by means of bolts 20a engaging appropriate threads in flange 15. Thus, material charged via inlet conduit 7 is confined to passage into inlet plenum 8, annular space D, plenum 17 and discharge via product outlet conduit 16.

For the embodiment shown in FIG. 1, the vertical elevation of the reactor is divided into a preheat zone designated as A-A', a conversion zone designated as A'-B, a fuel mixing and initial combustion zone designated as B-B', and a reaction product quench zone designated as B'-C. Within the reactor, and for substantially the vertical elevation of the quench section B'-C, there is disposed metal shell 25 which is substantially cylindrical and coaxial with metal shell 2. The bottom and top portion of shell 25, at its outer periphery as at 25a and 25b, is of such dimension as to tightly abut the inner wall of shell 2 thereby providing at the top and bottom portion of shell 25 a gas seal with shell 2. Intermediate the sealed top and bottom portion of shell 25, the outside wall of shell 25 is indented whereby a confined annular space E is provided between shell 2 and shell 25 which, as shown, is provided with an inlet orifice 26 (or a plurality thereof, not shown) and a gas outlet orifice 27 (or a plurality thereof, not shown) at the top and bottom portions respectively, of shell 25. By means of gas inlet orifice 26, the confined annular space E is in open communication with plenum 28, and by means of orifice 27, the annular space E is in open communication with a gas mixing zone M. Thus, an oxidizing gas (e.g., combustion air, the flue gas-air mixture) introduced via conduit 12 is confined to passage in plenum 28, into annular space E via orifice 26 and out of annular space E via orifice 27 into mixing zone M.

Extending through an appropriate opening at the top of the reactor, i.e., at the top of flange 18, is an externally threaded conduit 30 engaging internal threads in flange 18, said conduit 30 being in turn in open communication with a downwardly extending conduit 31 which, by means of external threads at its bottom portion, engages an internally threaded gas distributor 32 which, by means of welds at 33 is rigidly adhered to shell 25 and seals plenum 28 from mixing zone M. In gas distributor 32, a plurality of orifices 34 are provided whereby a fuel gas introduced via conduit 30 is confined to passage through conduit 31 and orifices 34 into mixing zone M. Orifices 34 are so positioned as to direct the fuel gas exiting therefrom tangentially into the gas exiting from orifice 27 whereby uniform gas mixing occurs in zone M.

For further sealing of plenum 28 from annular zone D and to aid in support of the assembly, a studded ring 35 is bolted by means of bolts 36 to flange 18. Seal gasket 42 is provided for such sealing when compressed by tightening bolts 36.

Also disposed within the reactor is a suitable refractory 40 (e.g., mullite) in the form of a substantially solid cylinder of smaller diameter than the inside diameter of shell 2 and coaxially disposed with shell 2 whereby annular space F is provided between refractory 40 and shell 2. By use of an integral refractory centering plug 36, refractory 40 is maintained in position by an appropriate centering indentation, as by indentation 43 in gas distributor 32. The refractory 40 extends, as shown, upwardly in the reactor to an elevation defining the bottom of gas mixing zone M.

At its bottom portion, refractory 40 has a centrally disposed centering extension 45 that fits into an accommodating indentation 44 of a member 46 having a closed top, and open at the bottom, such as to form plenum 41 in open communication with combustion gas discharge conduit 13. As shown, the outside diameter of member 46 is smaller than the inside diameter of shell 2, whereby, being coaxially disposed with shell 2, an annular space is provided between shell 2 and member 46 and which annular space is a continuation of annular space F. As is further shown, the bottom of member 46 is, at its outer periphery at 46a, of outside diameter such as to abut against the interior wall of shell 2 whereby, in combination with split ring collar 47, ring collar 47 transfers compression caused by tightening bolts 48 to provide a seal via gasket 10, thus sealing plenum 41 from annulus D and plenum 8. Member 46 has an orifice 49 (or a plurality thereof, not shown) providing open communication of annular space F with plenum 41 whereby, a gas mixture from zone M is confined to passage into annular space F and from F to plenum 41 via orifice 49 and out of the reactor via outlet conduit 13.

In the apparatus of FIG. I and the described arrangement and disposition of the components thereof, feed reactant is introduced via conduit 7 into plenum 8 from which it passes into and up through the preheat portion A-A' of annular space D, into the conversion portion A'-B of annular space D and into the quench portion B'–C from which the quenched reaction product passes into plenum 17 and out of the reactor via conduit 16.

An oxidizing medium (e.g., air, flue-gas-air mixture) is introduced via conduit 12 into plenum 28 from which the air passes via orifice 26 into and then downward through annular space E and, thence, via orifice 27 into gas mixing zone M. A combustible gas, such as a fuel gas, is introduced via conduit 30 through conduit 31 and orifices 34 into gas mixing zone M wherein the air from orifice 27 and gas from orifices 34 mix and undergo initial combustion in the area of M' and complete combustion in passing through annular space F whereupon the burned gas mixture enters plenum 41 via orifice 49 and is discharged from the reactor via conduit 13.

As an embodiment for carrying out a process embodied herein by utilizing the apparatus of FIG. I, air is fed via conduit 12 and a fuel gas is fed via conduit 30, at substantially below combustion temperature, and in proportions to provide a suitable combustible mixture. The relatively cool air that passes via orifice 26 into annular space E is heated by abstracting heat passing through shell 2 from the hot reaction product in annulus D as it passes through quench zone B'–C from conversion zone A'–B of annulus D, resulting in quenching of reaction product in passing upwardly through the quench zone. The resulting heated air, exited via orifice 27 into mixing zone M mixes therein with the fuel gas exiting via orifices 34. With the temperature of the air exiting via orifice 27 having been raised, by indirect heat exchange via the wall of shell 2, to a temperature sufficient to initiate combustion of the gas-air mixture, combustion is initiated in the area of M', and the combustion mixture upon entering annular space F undergoes complete combustion therein to supply the required heat flux through shell 2 into the reaction zone of annular space D. During downward passage of the combustion gas through the annular space F, heat is also given up by indirect heat exchange to the charge passing upwardly through the preheat zone A–A' of annulus D, whereupon the completely burned gas mixture passes through orifice 49 into plenum 41 and out of the reactor via conduit 13.

In such an operation, the fuel gas-combustion air mixture is completely burned shortly following entry from zone M' into annular space F due to surface combustion; and such an operation is carried out using excess air or air-flue gas mixture to control the peak combustion temperature and provide sensible heat exchange balance between the reaction product and air or air-flue gas in the quench section of the reactor, and between the combustion gas mixture and the charge material in the preheat zone.

In a specific embodiment, untilizing an apparatus as shown in FIG. I for thermal conversion of a light naphtha to a reaction product mixture comprising ethylene, the following sets forth details of a suitable embodiment of such an apparatus and suitable conditions for carrying out such a conversion therewith.

Reactor:

Vertical height of preheat zone A–A'=15¾"
Vertical height of conversion zone A'–B=12"
Vertical height of quench zone B'–C=8"
Vertical height of mixing zone B–B'=2½"
Width of annulus D= 0.019–0.031 inch
Width of annulus E=0.036–0.048 inch
Width of annulus F=0.064–0.105 inch
Thickness of shells 1 and 2=¼ inch
Outside diameter of shell 1=8⅛ inches Materials of construction:

Refractory 40=mullite; expansion coefficients at 100–1000° F.=$1.8 \times 10^{-6}$ in./in. ° F.; at 100–2500° F. =$3.4 \times 10^{6}$ in./in. ° F.

Shell 1 and shell 2=alloy HI; (high chrime-nickel alloy) expansion coeffcients at 100–1000° F.=$9.9 \times 10^{-6}$ and at 100–2000° F.=$10.8 \times^{-6}$ in./in. ° F.

Charge materials:
Via conduit 7=97.5 lbs./hr. (naphtha of 280° F. end point and 20 wt. percent steam) at 400° F.
Via conduit 12=283 lbs./hr. at 100° F. of air-flue gas mixture (vol. ratio of 1:1)
Via conduit 30=7.3 lbs./hr. of fuel gas at 100° F.

Gas temperatures in reactor:
In preheat zone of annulus D—
    at A=400° F.
    at A'=1300° F.
In conversion zone of annulus D—
    at A'=1300° F.
    at B=1700° F.
In quench zone of annulus D—
    at B'=1700° F.
    at C=900° F.
In annulus F and annulus E—
    at A=1000° F.
    at A'=1770° F.
    at B=2800° F.
    at B'=900° F.
    at C=100° F.

Gas velocities:
In annulus D—
    at A=66 ft./sec.
    at A'=118 ft./sec.
    at B–B'=326 ft./sec.
    at C=193 ft./sec.
In annulus F and E—
    at A=282 ft./sec.
    at A'=278 ft./sec.
    at B=320 ft./sec.
    at B'=296 ft./sec.
    at C=153 ft./sec.

Heat flux into annulus D by indirect heating through shell 2—
    at A 265,000 B.t.u./hr./sq. ft.
    at A' 22,500 B.t.u./hr./sq. ft.
    at B 67,000 B.t.u./hr./sq. ft.
    at B' 52,000 B.t.u./hr./sq. ft.
    at C 37,500 B.t.u./hr./sq. ft.

Residence time in conversion zone A'–B of annulus D=0.0045 sec. Product discharge via conduit 16=97.5 lbs./hour at 900° F.; total conversion of 93%, about 43% ethylene. Combustion gas discharge via conduit 13=290.3 lbs./hour at 1000° F.

In another embodiment, there is shown in perspective in FIG. II a reactor comprising a rectangular metal plate 50, beveled at the edges as shown at 51, and a corresponding metal plate 52, also beveled at its edges as shown at 53 such that, by bringing the two metal plates together and welding the plates together at the bevels, there is formed a reactor having a reaction zone 54 in the form of a slot provided in plate 52 in open communication with an inlet 55 for charging material to be converted into reaction zone 54 and in open communication with an outlet 56 for discharge of conversion product from reaction zone 54. By use of appropriate means, such as a conduit (not shown), inlet means 55 is connected to a source of charge material and, similarly, outlet means 56 is appropriately connected to a conduit or other suitable means for passing discharged product from outlet 56 to storage or to suitable means for quenching the discharged product. In such an embodiment, and for which the required heat flux into reaction zone 54 is suitably provided by use of an induction coil to heat plates 50 and 52, the reaction zone 54 is restricted to a dimension of not more than about 0.1 inch (average) between plates 50 and 52.

In operation, and using an apparatus as shown in FIG. II of the following size and dimensions, the following Table I sets forth data obtained from several runs, using various types of hydrocarbon charge stocks and the product yields under the conditions set forth in the table.

Size of plates 50 and 52=3¼" x 2" x ¾"
Size of inlet 55 and outlet 56=⅛" slot
Reaction zone 54=overall length, 2¼"; maximum width, 1"; average depth, 0.01".
Material of construction=310 stainless or graphite.

For the runs for which data are set forth in Table I, a graphite reactor was used for runs carried out at temperatures above 2000° F. and a stainless steel reactor for the other runs. The runs were carried out with the feed set forth for each run with the exception of the last run in which the charge was 280° F. end point naphtha and steam in a weight ratio of steam to naphtha of 1.4:1.

an inside diameter of one-half inch and about thirty-two inches long; and plug 61 a refractory material or a metal (e.g. high chrome-nickel alloy) of such dimensions that the annular space between shell 60 and plug 61 is about 0.025 inch. With the induction coil 72 being of sufficient capacity to provide the required heat flux into the annular space by indirect heat exchange while maintaining the reaction zone of the annular space at about 1700° F., a charge (at 400° F.) of 5.1 lbs. of naphtha and 1.3 lbs. per hour of steam is fed via inlet conduit 65 and in passing through the annular space undergoes further preheat and conversion in passing through the portion of the annular space designated X–X' (approximately 13" long in the aforesaid embodiment) and in continuing its passage the conversion product undergoes quenching at the zone of Y–Y' (approximately 14") and is discharged from the reactor via outlet conduit 69.

As is apparent from the data set forth hereinbefore, and particularly in Table I, practice of the method of this invention results in markedly high thermal conversions

TABLE 1

| Charge via inlet 55 | Feed rate, lbs./hr. | Temp. of charge, °F. | Temp. in reaction zone, °F. | Heat flux, B.t.u./ft.²/hr.×10³, into reaction zone 54 | (Atm.) Partial pressure | Total conversion, percent | Products (weight percent, discharged via outlet 56) | | | | | | | | |
|---|---|---|---|---|---|---|---|---|---|---|---|---|---|---|---|
| | | | | | | | $H_2$ | $CH_4$ | $C_2H_4$ | $C_2H_2$ | $C_3H_6$ | $C_2H_6$ | $C_4+$ | $C_4H_6$ | $C_4H_6$ |
| Propane | 0.8 | 800 | 2,600 | 205 | 1.0 | 98 | 6.1 | 34 | 5 | 45 | 6 | 0.0 | 2 | | |
| | 0.4 | 800 | 1,750 | 100 | 1.0 | 92.7 | 3.1 | 21.4 | 47.4 | 5 | 10 | 3.0 | | | |
| | 0.4 | 800 | 2,000 | 110 | 1.0 | 98 | 4.1 | 29.8 | 43.6 | 11.0 | 2 | 0.4 | | | |
| Methane | 0.3 | 1,100 | 3,050 | 180 | 1.0 | 85 | 46 | 54 | | | | | (¹) | | |
| Ethane | 0.66 | 800 | 2,170 | 54 | 1.0 | 99 | 12.6 | 22.2 | 40.4 | 21 | 0.7 | 0.7 | | 1.7 | |
| | 0.66 | 800 | 2,000 | 40 | 1.0 | 97 | 6.5 | 10.6 | 64.0 | 6.2 | 1.2 | 7.9 | | 2.9 | |
| Ethylene ² | 0.6 | 800 | 1,870 | 40 | 1.0 | 15.5 | 1.9 | 15 | | 46 | 7.5 | | | 30 | |
| Lt. Naphtha | 0.8 | 500 | 1,550 | 54 | 1.0 | 84 | 1.2 | 11.2 | 36 | 0.7 | 15.8 | 3.0 | 9.0 | 8.2 | |
| 140–280° F | 0.5 | 800 | 2,050 | 50 | 1.0 | 92 | 5.9 | 24.2 | 33 | 26 | 1.9 | 0.0 | 5.7 | 0 | |
| | 0.5 | 800 | 2,150 | 50 | 1.0 | 93 | 9.7 | 25.0 | 16.6 | 41 | 1.1 | 0.0 | 7.7 | 0 | |
| Lt. Naphtha | ³ 0.5 | 500 | 1,750 | 75 | 0.2 | 91 | 3.5 | 13.3 | 41.7 | 3.1 | 11.7 | 2.8 | ⁴15.0 | 4.8 | 3.3 |

¹ Coke.
² Ethylene recycled to extinction.
³ Naphtha.
⁴ Includes 9% $C_5+$ and 6% carbon as $CO_1CO_2$.

In FIG. III of the drawings, there is shown an embodiment of an induction heated annular reactor in which cylindrical metal outer shell 60 is coaxially disposed with a cylindrical plug 61 of smaller outside diameter than the inside diameter of shell 60 and plug 61 whereby there is provided an annular space in between shell 60, such an annular space having an appropriate dimension averaging not more than about 0.1 inch as the distance between the inner wall of shell 60 and the outer wall of plug 61. By means of internal threads, a closure cap 62 engages external threads of shell 60 at threads 63 such as to provide an inlet plenum 64 into which feed to the reactor is charged via inlet conduit 65. At the opposite end portion of shell 60, a closure cap 66, internally threaded, engages external threads 67 of shell 60 such as to provide a product discharge plenum 68 from which conversion products pass out of the reactor via discharge conduit 69. To position, and maintain in position, plug 61 with respect to shell 60, several slot pin spacers 70 and spotwelds 71 are disposed as shown. Appropriately disposed, as a means for providing required heat flux into the conversion zone of the annular space between shell 60 and plug 61, is an induction coil 72.

In operation, using the apparatus of FIG. III, the charge material to be converted is fed, preferably preheated, through inlet conduit 65 into plenum 64 from which the charge material is confined to passage through the annular space between shell 60 and plug 61, and then into product plenum 68 and out of the reactor through discharge conduit 69. In an embodiment, and using such an apparatus for thermal conversion of a naphtha to a mixture containing ethylene as the predominant component, shell 60 can be a metal tube (e.g. high chrome-nickel alloy) having an outside diameter of one inch, of feed stocks, such as saturated hydrocarbons, to produce mixtures containing a relatively large amount of a desired unsaturated compound, depending on the particular conditions employed for directing the conversion to production of the desired compound. Thus, as exemplified by the thermal conversion of propane, total conversions of over 90% can be obtained with, depending on the conditions used in practice of this invention, yields of as high as 45 wt. percent of acetylene, or as high as 47.4 wt. percent of ethylene, or a total as high as 54% as the sum of ethylene and acetylene. Similarly, from ethane, total conversions on the order of 97 and 99% are obtained, as shown in Table I, with wt. percent yields of ethylene as high as 40.4 and 64.0 and, in the case of the 40.4 yield of ethylene, the additional yield of as much as 21 wt. percent of acetylene.

An important aspect of the present invention is that, by practice thereof as aforediscussed and illustrated by thermal conversion of light naphtha for maximum production of ethylene as the most desired product, the present invention can be carried out not only to provide a high conversion to olefins but, at the substantially high conversions (e.g. 50 wt. percent or more) to total olefins, the wt. percent converted to the most desired product (e.g. ethylene) can be as much as about 34% when the total conversion to olefins is on the order of about 52%, and the substantially high relative proportion of ethylene to total olefins is obtained even as the total conversion to olefins increases to values much higher than about 50 wt. percent. Such a relatively high yield of desired olefin (e.g. ethylene) at exceptionally high values of wt. percent conversion to total olefins by a thermal conversion process, as embodied herein, is a marked improvement over certain other known processes for thermal conversion of, for example, saturated hydrocarbons to unsaturated hydrocarbons and which, illustrated by desired production of ethylene from light naphtha, generally provide a reduced proportional yield of ethylene based on total yield of olefins as the total olefin yield increases and, particularly, when the total olefin yield amounts to more than 40 or 50 wt. percent (based on the charge). Of such other known processes are those of the steam coil type, moving bed converters, (e.g. pebble heaters), partial combustion processes, inert fluidized bed methods, and others.

Although, in the foregoing description of the invention, and the embodiments used for purposes of illustration and not limitation, certain conditions have been set forth for carrying out the invention, the following tabulation sets forth a correlation of several conditions that may be used, such as for conversion of more saturated hydrocarbons to more unsaturated hydrocarbons, within the scope of this invention. In such a tabulation, the values shown in the column under I apply for extremely high temperature reactions and those under II for reactions requiring temperatures on the low side of the temperature range of reactions to which this invention is directed. As for reactions requiring temperatures over about 1200° F. and below 4000° F., appropriate values intermediate the ranges shown for each of the conditions set forth in the tabulation can be used.

|  | I | II |
|---|---|---|
| Width of reaction zone | 0.001 to | 0.1 |
| Temp. in conversion zone (° F.) | 4,000 to | 1,200 |
| Length of conversion zone (inches) | 2 to | 36 |
| Residence time in conversion zone (seconds) | 0.0001 to | 0.01 |
| Heat flux into conversion zone [1] | 200,000 to | 20,000 |

[1] B.t.u./hr./ft.² of internal surface through which heat is passed.

In the foregoing description of the invention, and in the embodiment described in connection with the apparatus of FIG. I, the quenching of the conversion product is carried out in the unitary apparatus by indirect heat exchange with the oxidizing gas (e.g. air). In the embodiment described in connection with the apparatus of FIG. III, the quenching can be either fully or partially effected in the annulus, subsequent to the conversion zone portion thereof, through which the reaction product passes prior to discharge from the reactor and, in such an instance as well as in other embodiments wherein the conversion reaction is carried out as embodied herein, the reaction product can be subjected to quenching by other methods suitable for effecting prompt quenching by reduction of the product to a temperature at which substantial reaction of components of the product mixture is minimized or completely inhibited. Thus, and illustrated by embodiments utilizing apparatus as disclosed by FIGS. II and III, such quenching can be carried out by recycling product mixture at a substantially lower temperature to the product mixture exiting from the reactor; by use of conventional water-spray methods, oil quench methods, cooling coils, and others.

In reference to the apparatus aspects of this invention, the materials of construction used therefor, and particularly for structures defining the reaction zone, the materials of construction should possess, for the particular temperature and conversion atmosphere to which they are exposed, a suitable combination of high dimensional stability, expansion coefficients and thermal conductivity. Other than materials hereinbefore disclosed in describing embodiments of apparatus suitable for practice of this invention, and depending on the particular process to be carried out in the apparatus, materials such as graphite, fused alumina, graphite coated with metals (e.g. silicon, tantalum, zirconium, titanium, tungsten, hafnium, molybdenum), cermets, and others may be used.

The conversion process embodied herein can be carried out over a rather wide range of pressure (partial) and, although it is not intended to limit the process with respect thereto, it can be carried out at sub-atmospheric to about 70 p.s.i.g.

Although the present invention has been described with particular embodiments, it is to be understood that modifications and variations may be resorted to, without departing from the spirit and scope of this invention, as those skilled in the art will readily understand. Such variations and modifications are considered to be within the purview and scope of the appended claims. Thus, as embodiments, reactors and the process of this invention include use of a plurality of reactors in assemblies such that individual reactors can be put on or taken off stream as desired for servicing, repair, etc.

What is claimed is:

1. A method for effecting relatively high temperature thermal reactions which comprises passing a thermally-convertible reactant into a preheat zone of a continuous confined path comprising successively a preheat zone, a conversion zone and a quench zone and in which path the reactant is preheated in the preheat zone to an elevated temperature but below thermal conversion temperature, the thus preheated reactant passes into the conversion zone wherein it is thermally converted and the resulting conversion product passes into the quench zone wherein it is quenched to a temperature sufficient to prevent substantial further reaction of the conversion product, said quenching of the conversion product in the quenching zone, conversion of the preheated reactant in the conversion zone and preheating of the reactant in the preheat zone being effected by passing an oxidizing gas at a temperature substantially lower than quench temperature into indirect heat exchange with said quench zone to quench conversion product passing into said zone and to raise the temperature of the oxidizing gas to a temperature that supports combustion of a mixture of said oxidizing gas with a combustible fuel, mixing a combustible fuel with said oxidizing gas raised to said combustion temperature whereby the mixture undergoes combustion and by indirect heat exchange with the conversion zone the mixture under combustion supplies the necessary heat flux to the conversion zone, and following said indirect heat exchange with the conversion zone, passing the combusted mixture into indirect heat exchange with the preheat zone whereby sensible heat of the combusted mixture preheats the reactant in the preheat zone.

2. A method, as defined in claim 1, wherein the oxidizing gas is air and the combustible fuel is a fuel gas.

3. A method, as defined in claim 2, wherein the reactant is a hydrocarbon that is gaseous at the conversion temperature and is thermally convertible to a more unsaturated hydrocarbon.

4. A method, as defined in claim 1, wherein the reactant is a hydrocarbon that is gaseous at from about 1200 to about 4000° F.

5. A method, as defined in claim 4, wherein the hydrocarbon is pyrolyzed to a product mixture containing a hydrocarbon more unsaturated than the reactant.

6. A method, as defined in claim 5, wherein the reactant is from the group consisting of methane, ethane, propane, ethylene and naphtha.

7. A method, as defined in claim 1, wherein the reactant passing through the conversion zone is confined to a stream having in cross section a minor axis of from about 0.008 to about 0.07 inch.

8. A method, as defined in claim 1, in which the reactant passing through the conversion zone is confined to a stream having a minor axis averaging not more than about 0.1 inch.

9. A method, as defined in claim 8, wherein the conversion zone, in the direction of reactant flow therethrough, is at least thirty times said axis averaging not more than about 0.1 inch.

10. A method, as defined in claim 1, wherein the reactant requires for thermal conversion a temperature in the range of from about 1200 to about 4000° F. and a heat of reaction of from about 2000 to about 12,000 B.t.u./lb. of reactant, the reactant is maintained in the conversion zone for from about 0.0001 to about 0.01 second while the temperature in the conversion zone is maintained at from about 1200 to about 4000° F., and the heat of reaction of from about 2000 to about 12,000 B.t.u./lb. of reactant is maintained in the conversion zone by supply thereto of a heat flux of from about 20,000 to about 200,000 B.t.u./hr./sq. ft. of internal surface of said conversion zone through which heat is supplied by the mixture under combustion.

11. A method, as defined in claim 1, wherein the conversion zone confines the reactant to an annular stream.

12. A method, as defined in claim 1, wherein the reactant is a hydrocarbon that is pyrolyzed in the conversion zone to a less saturated hydrocarbon conversion product, the oxidizing gas is air, and the combustible fuel is a fuel gas.

13. An apparatus, adapted for carrying out relatively high temperature thermal reactions, comprising an elongated confined annulus having an inlet means at one end portion adapted to pass reactant into a preheat chamber in said annulus and an outlet means at the opposite end portion for discharge of reaction product from a quench chamber in said annulus, said annulus being characterized by comprising successively and in open communication a preheat chamber, a conversion chamber and a quench chamber with the conversion chamber having internal wall surfaces adapted to confine reactant passed from the preheat chamber into the conversion chamber to a stream which, in cross-section, has a minor axis averaging not more than about 0.1 inch, means adapted for passing an oxidizing gas into indirect heat exchange with the quench chamber whereby to abstract heat from the reaction product passed from the conversion chamber into the quench chamber and the oxidizing gas is raised to a temperature that supports combustion with a combustible fuel, mixing means for mixing said oxidizing gas at combustion temperature with a combustible fuel whereby the resulting mixture undergoes combustion, and means for passage of the mixture under combustion into indirect heat exchange with the conversion chamber to provide the necessary heat flux in said conversion chamber and for passage of the resulting combusted mixture into direct heat exchange with the preheat chamber whereby sensible heat of the combusted mixture preheats reactant passed into the preheat chamber of said chamber.

14. An apparatus, adapted for carrying out relatively high temperature thermal reactions, comprising a vertically elongated confined annulus defined by coaxially and concentrically disposed shells of material adapted to withstand a temperature in the range of from about 1200 to about 4000° F. with one shell having an outside diameter smaller than the inside diameter of the other shell such that the distance between the inside wall of the shell of said larger inside diameter and the adjacent wall of the shell of said smaller outside diameter averages not more than about 0.1 inch, said annulus comprising successively and in open communication from one end portion to the opposite end portion a preheat chamber, a conversion chamber and a quench chamber, inlet means for passing a reactant into the preheat chamber and an outlet means for discharge of quenched conversion product from the quench chamber, means for passing an oxidizing gas into indirect heat exchange with said quench chamber, mixing means inside of said shell of smaller outside diameter for mixing a fuel gas with said oxidizing gas following said indirect heat exchange of said oxidizing gas with the quench chamber, and means adapted for directing passage of the resulting combustible mixture while under combustion into indirect head exchange with said conversion chamber and for directing passage of the combusted mixture, following said heat exchange with the conversion chamber, into indirect heat exchange with the preheat chamber whereby sensible heat from the combusted mixture preheats reactant passed into said preheat chamber.

15. An apparatus, adapted for carrying out relatively high temperature thermal reactions, comprising an elongated confined annulus comprising successively and in open communicaton a preheat chamber, a conversion chamber, and a quench chamber, inlet means for passing a thermally-convertible reactant into the preheat chamber and outlet means at the substantially opposite end portion of said annulus for discharge of quenched conversion product from the quench chamber, means adapted for passing an oxidizing gas into indirect heat exchange relationship with the quench chamber, means for mixing a combustible fuel with said oxidizing gas following said indirect heat exchange with said quench chamber, and means to direct the mixture of said oxidizing gas and fuel while under combustion into indirect heat exchange with the conversion chamber and, following said heat exchange with the conversion, to direct passage of the combusted mixture into indirect heat exchange with the preheat chamber.

16. An apparatus, as defined in claim 15, wherein the elongated confined annulus is defined by coaxially and concentrically disposed cylindrical members, one of which has an outside diameter smaller than the inside diameter of the other member such as to provide said annulus comprising successively and in open communication a preheat chamber, a conversion chamber and a quench chamber, said means for mixing a combustible fuel with the oxidizing gas being disposed inside of the cylindrical member of smaller outside diameter.

References Cited by the Examiner

UNITED STATES PATENTS

| | | | |
|---|---|---|---|
| 1,677,363 | 7/1928 | Olivier | 260—683 |
| 2,283,643 | 5/1942 | Nagel | 260—683 |
| 2,529,598 | 11/1950 | Deanesly | 260—679 |
| 2,543,743 | 2/1951 | Evans | 260—683 X |
| 2,644,744 | 7/1953 | Hartwig et al. | 260—683 |
| 2,706,210 | 4/1955 | Harris | 260—683 |
| 2,786,877 | 3/1957 | King | 260—683 |
| 2,845,335 | 7/1958 | Hasche | 260—683 X |
| 2,868,856 | 1/1959 | Hale et al. | 260—679 |
| 2,904,502 | 9/1959 | Shapleigh | 260—683 X |

FOREIGN PATENTS 775,666   5/1957   Great Britain.

DELBERT E. GANTZ, Primary Examiner.

ALPHONSO D. SULLIVAN, Examiner.

C. E. SPRESSER, Assistant Examiner.